Feb. 19, 1935.   H. F. DIXON   1,991,497
WHEEL ASSEMBLY
Filed May 19, 1930   2 Sheets-Sheet 1

INVENTOR
Howard F. Dixon
By Whittemore Hulbert Whittemore & Belknap
ATTORNEYS

Feb. 19, 1935.     H. F. DIXON     1,991,497
WHEEL ASSEMBLY
Filed May 19, 1930     2 Sheets-Sheet 2
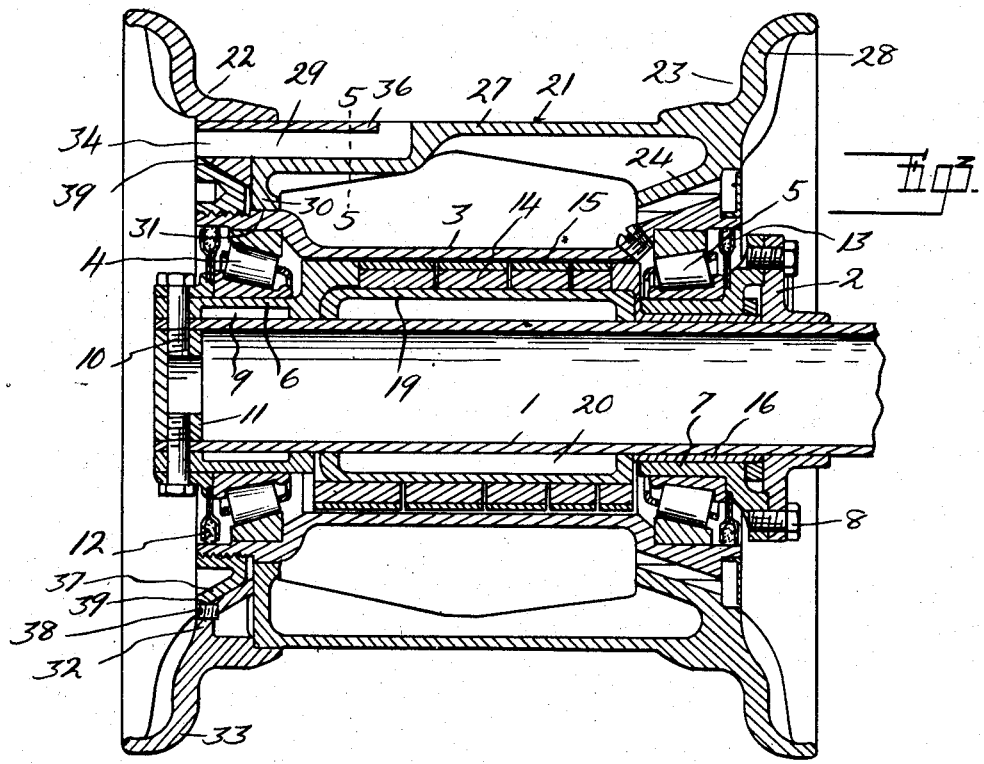
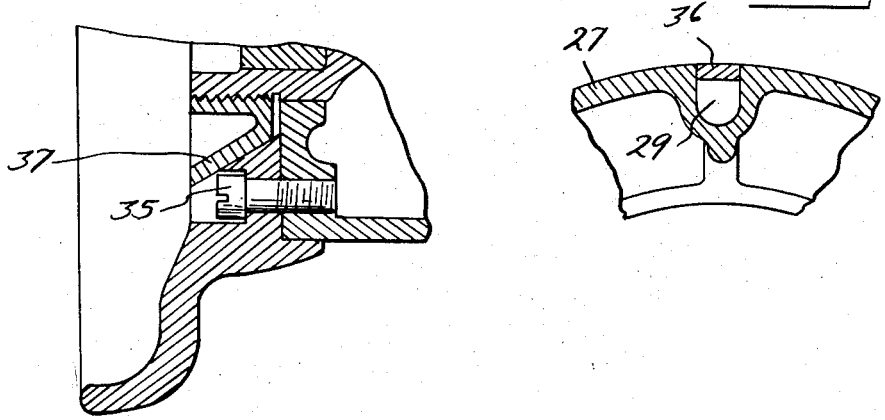
INVENTOR
Howard F. Dixon
BY Whittemore Hulbert
Whittemore & Belknap
ATTORNEYS

UNITED STATES PATENT OFFICE 1,991,497

WHEEL ASSEMBLY

Howard F. Dixon, Buffalo, N. Y., assignor to Kelsey-Hayes Wheel Corporation, Detroit, Mich., a corporation of New York Application May 19, 1930, Serial No. 453,802

3 Claims. (Cl. 301—5)

The invention relates to wheel assemblies and refers more particularly to wheel and brake assemblies. The invention has for one of its objects to so construct the wheel and brake assembly that it minimizes air resistance. The invention has for other objects to so construct the wheel that it is of the demountable type; that a tire may be readily removed therefrom or applied thereto by forming the wheel of sections detachably secured to each other; and that the means for detachably securing the wheel holds from disengagement the means for securing the sections toegther. The invention has for a further object the novel construction of the wheel for the passage of the tire valve stem and for peripherally positioning the sections. Still other objects of the invention will appear as more fully hereinafter set forth.

In the drawings:—

Figure 3 is a cross section on the line 3—3 of Figure 1;

Figure 4 is a cross section on the line 4—4 of Figure 1;

Figure 5 is a cross section on the line 5—5 of Figure 3.

Figure 1:
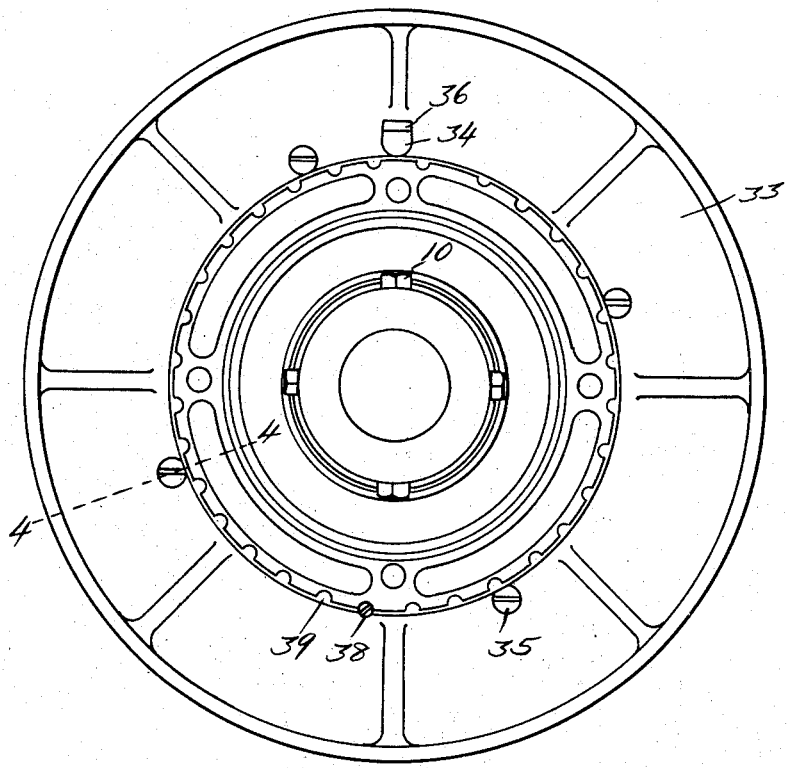
Figures 1 and 2 are opposite end views, partly broken away, of a wheel and brake assembly embodying my invention.
Figure 2:
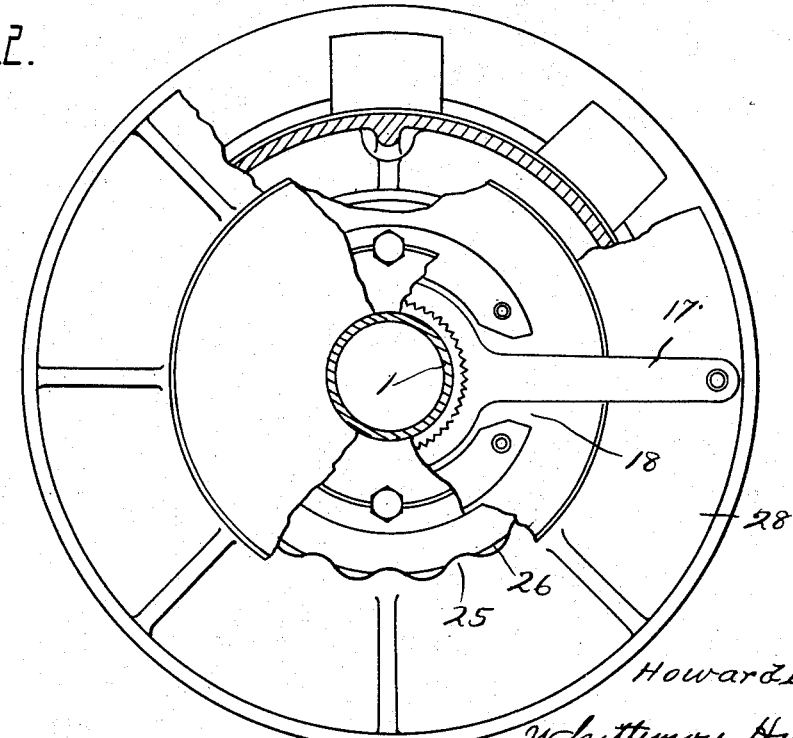

The wheel and brake assembly illustrating an embodiment of my invention is particularly applicable to aircraft, since with its construction air resistance is minimized. 1 is the axle which is preferably tubular and is suitably secured to the aircraft as by means of the torque reacting flange member 2. 3 is the tubular hub preferably having its opposite ends enlarged for receiving the anti-friction bearings 4 and 5, which in the present instance are roller bearings. The inner race of the anti-friction bearing 4 is mounted upon the support 6, which latter encircles and engages the axle 1. The inner race of the anti-friction bearing 5 is mounted upon the support 7, which encircles and is spaced from the axle 1 and is carried by the flange member 2 and secured thereto by suitable means, such as the bolts 8. The support 6 has in its inner face the annular recess 9 for the purpose of reducing the weight of the support. This support is fixedly secured to the axle by suitable means, such as the radial bolts 10, which extend through the walls of the support and axle and are threaded into the plug 11 for closing the end of the axle. These bolts also secure in place the packing 12 for closing the annular space between the inner race of the anti-friction bearing 4 and the adjacent enlarged end of the hub. The packing 13 between the inner race of the anti-friction bearing 5 and the adjacent enlarged end of the hub is suitably secured in place by being clamped between the inner race and the support 7.

14 is a spiral braking element within the hub 3 and having the braking surface 15 for engaging the inner face of the hub. One end of this spiral braking element is engageable with a fixed shoulder or abutment formed upon the support 6 and extending parallel to its axis. The other end of this spiral braking element is engageable by a shoulder or abutment formed upon the tubular brake actuating member 16. This latter shoulder or abutment also extends parallel to the axis of the actuating member, which latter freely encircles the axle 1 and passes through the support 7 and is adapted to be rotated by suitable means, such as the lever 17. This lever is secured to the outer end of the tubular member and extends outwardly between the flanged member 2 and the support 7, the latter being cut away at 18 for this purpose. To facilitate initial assembly and also to hold the braking element in operative position, I have provided the sleeve or bearing 19, which is encircled by the braking element and is rotatably mounted upon the axle 1 between the supports 6 and 7. This sleeve or bearing preferably has the annular recess 20 in its inner face for reducing its weight.

21 is the wheel which is designed to be detachably mounted upon the hub 3 and to be driven therewith. This wheel comprises the front and rear sections 22 and 23, respectively, preferably formed of castings and having peripheral portions adapted to cooperate to form the rim for carrying a pneumatic tire. The rear section 23 has at its rear end the forwardly tapered boss 24, the inner face of which is corrugated to form the teeth 25 for meshing with the correspondingly inclined teeth 26 upon the rear enlarged end of the hub 3. The peripheral portion of this rear section is formed with the cylindrical rim portion 27 and the annular tire retaining flange 28 at the rear edge thereof. At one point in the circumference of the rim portion 27 there is the transverse groove 29 which normally opens radially outwardly. The rear section has at its front end the portion 30 which extends radially inward from the rim portion 27 and is adapted to rest upon the annular seat 31 formed upon the front enlarged end of the hub 3. The smallest diameter of the teeth 25 at the rear end of the rear section is greater than that of the annular seat 31, so that the rear section and consequently the wheel may be readily removed from the hub.

The front section 22 has the body portion 32 and the annular tire retaining flange 33, which latter is adapted to overlap the rim portion 27. The body 30 is formed with the transverse opening 34, which is adapted to register with the transverse groove 29. For detachably securing these sections to each other when the wheel is dismounted from the hub, I have provided the screws 35, which extend transversely through the body 32 and are threaded into the front portion 30 of the rear section 23. For peripherally positioning the front and rear sections of the wheel so that the opening 34 registers with the groove 29 and for the purpose also of aiding in transmitting torque from the rear section to the front section, I have provided the key 36 which is insertable through the opening 34 into the groove 29 and terminates short of its inner end, so that the tire valve stem may pass through this groove and opening and have its front end exposed laterally beyond the front section of the wheel. This key is in continuation of the cylindrical surface of the rim portion 27 and thus partially covers the slot in the rim portion.

To detachably secure the wheel upon the hub, I have provided the nut 37, the inner face of which is threaded upon the front portion of the enlarged front end of the hub 3 and the outer face of which is conical and tapers rearwardly to engage the correspondingly shaped face upon the body 32 of the front wheel section. This nut partially covers the heads of the screws 35 and thereby holds these screws from disengagement while the wheel is mounted upon the hub. To lock the nut from accidental disengagement there is the set screw 38, which is adapted to pass through one of the notches 39 in the periphery of the nut and to be threaded into the body of the front wheel section.

What I claim as my invention is:

1. In a wheel assembly, the combination of cooperating sections forming a tire carrying rim, one of said sections having a transverse groove and another of said sections having a transverse opening, said groove and opening cooperating to form a passage for a tire valve stem, and a member extending within said opening and groove for registering one with the other and partially covering said groove.

2. A vehicle wheel having a hub, separable sections cooperating to form a tire carrying rim, means for detachably securing said sections together, and a nut removably secured to the forward end of the hub and engageable with the front side of the forwardmost section for demountably securing both sections to the hub and having a portion operable to hold the aforesaid means from disengagement.

3. A vehicle wheel having a hub, a wheel body mounted on said hub and comprising axially separable sections, means for detachably securing said sections together, and a nut removably secured to the forward end of the hub and engageable with the front side of the forwardmost section for detachably securing both sections to the hub and having a portion operable to hold the aforesaid means from accidental disengagement.

HOWARD F. DIXON.